(12) United States Patent
Akieda et al.

(10) Patent No.: US 12,298,283 B2
(45) Date of Patent: May 13, 2025

(54) LIQUID CHROMATOGRAPH ANALYZER AND METHOD OF CONTROLLING THE SAME

(71) Applicant: Hitachi High-Tech Corporation, Tokyo (JP)

(72) Inventors: Daisuke Akieda, Tokyo (JP); Makoto Nogami, Tokyo (JP); Shinya Ito, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 407 days.

(21) Appl. No.: 17/433,884

(22) PCT Filed: Feb. 26, 2020

(86) PCT No.: PCT/JP2020/007598
§ 371 (c)(1),
(2) Date: Aug. 25, 2021

(87) PCT Pub. No.: WO2020/175510
PCT Pub. Date: Sep. 3, 2020

(65) Prior Publication Data
US 2022/0050088 A1    Feb. 17, 2022

(30) Foreign Application Priority Data
Feb. 26, 2019   (JP) ................. 2019-032872

(51) Int. Cl.
*G01N 30/20*   (2006.01)
*G01N 30/46*   (2006.01)
(Continued)

(52) U.S. Cl.
CPC ..... *G01N 30/468* (2013.01); *G01N 2030/027* (2013.01); *G01N 2030/328* (2013.01); *G01N 2030/385* (2013.01)

(58) Field of Classification Search
None
See application file for complete search history.

(56) References Cited

U.S. PATENT DOCUMENTS 2,972,246 A * 2/1961 Reinecke ............. G01N 30/466
                                                          73/23.39
3,892,531 A * 7/1975 Gilbert ............... G01N 33/6818
                                                          422/89
(Continued)

FOREIGN PATENT DOCUMENTS

CN    106461622 A    2/2017
EP    2 244 091 A1   10/2010
(Continued)

OTHER PUBLICATIONS

International Search Report (PCT/ISA/210) issued in PCT Application No. PCT/JP2020/007598 dated Apr. 21, 2020 with English translation (ten (10) pages).
(Continued)

Primary Examiner — Jamel E Williams
Assistant Examiner — Alex T Devito
(74) Attorney, Agent, or Firm — Crowell & Moring LLP

(57) ABSTRACT

Tests of channels of a system as a whole can be easily performed without adding a complicated mechanism. A liquid feeding part includes a liquid feeding channel to feed a mobile phase, a drainage channel to release pressure in the liquid feeding channel, an analysis channel that discharges the mobile phase into the sample introduction part, and a channel switching valve that selectively connects the liquid feeding channel to one of the drainage channel and the analysis channel. The channel switching valve is configured to be able to provide a tight stopper state in which the liquid feeding channel is connected to neither the analysis channel nor the drainage channel.

9 Claims, 9 Drawing Sheets

(51) Int. Cl.
*G01N 30/02* (2006.01)
*G01N 30/32* (2006.01)
*G01N 30/38* (2006.01)

(56) References Cited

U.S. PATENT DOCUMENTS

| | | | |
|---|---|---|---|
| 4,059,009 A * | 11/1977 | Ball | G01N 30/22 |
| | | | 73/864.83 |
| 5,398,110 A * | 3/1995 | Kitaoka | G01N 21/4133 |
| | | | 356/130 |
| 7,685,866 B2 | 3/2010 | Bierbaum et al. | |
| 2004/0118781 A1 * | 6/2004 | Ma | B01D 15/1828 |
| | | | 210/659 |
| 2006/0155486 A1 * | 7/2006 | Walsh | G01N 33/0034 |
| | | | 702/32 |
| 2011/0116973 A1 | 5/2011 | Choikhet | |
| 2014/0299542 A1 | 10/2014 | Song et al. | |
| 2014/0326664 A1 * | 11/2014 | Joudrey | G01N 30/20 |
| | | | 137/625.13 |
| 2017/0106364 A1 | 4/2017 | Tomita | |
| 2018/0128789 A1 | 5/2018 | Hollnagel et al. | |
| 2018/0340916 A1 | 11/2018 | Song et al. | |
| 2020/0072204 A1 | 3/2020 | Yanagibayashi | |

FOREIGN PATENT DOCUMENTS

| | | | | |
|---|---|---|---|---|
| JP | H08240564 | * | 9/1996 | |
| JP | 10-132796 A | | 5/1998 | |
| JP | 2005-257609 A | | 9/2005 | |
| JP | 2007-527014 A | | 9/2007 | |
| JP | 2008-209334 A | | 9/2008 | |
| JP | 2011-99764 A | | 5/2011 | |
| JP | 2012-83372 A | | 4/2012 | |
| JP | 2015-52533 A | | 3/2015 | |
| WO | WO-0064557 A1 | * | 11/2000 | G01N 30/466 |
| WO | WO 02/086437 A1 | | 10/2002 | |
| WO | WO 2005/091924 A2 | | 10/2005 | |
| WO | WO 2010/139359 A1 | | 12/2010 | |
| WO | WO 2018/207295 A1 | | 11/2018 | |

OTHER PUBLICATIONS

Japanese-language Written Opinion (PCT/ISA/237) issued in PCT Application No. PCT/JP2020/007598 dated Apr. 21, 2020 (five (5) pages).

Extended European Search Report issued in European Application No. 20762355.4 dated Oct. 18, 2022 (three (3) pages).

Leister, W. et al., "Development of a Custom High-Throughput Preparative Liquid Chromatography/Mass Spectrometer Platform for the Preparative Purification and Analytical Analysis of Compound Libraries", Journal of Combinatorial Chemistry, American Chemical Society, May 1, 2003, pp. 322-329, vol. 5, No. 3, Washington, US, XP001198955 (eight (8) pages).

Chinese-language Office Action issued in Chinese Application No. 202080015451.6 dated Jan. 10, 2024 (8 pages).

* cited by examiner

LIQUID CHROMATOGRAPH ANALYZER AND METHOD OF CONTROLLING THE SAME

TECHNICAL FIELD

The present invention relates to a liquid chromatograph analyzer and a method of controlling the same.

BACKGROUND ART

A liquid chromatograph (LC) is a chromatograph that uses a liquid as the mobile phase to be fed to a column for separating a sample. A liquid sample containing the object of measurement to be introduced from an injection part into an analysis channel is sent to a column by the mobile phase. The liquid sample is separated into a plurality of components using the difference in affinity between the stationary phase and mobile phase which are filled in the column. The separated components are detected using a detector such as an ultraviolet-visible absorption photometer, fluorophotometer or mass analyzer.

The liquid chromatograph called High Performance Liquid Chromatograph (HPLC) uses a liquid compressed at high pressure by a liquid feeding apparatus with a reduced particle size of column filler to conduct analysis, for the purpose of shortening the analysis time and improving the separation performance. Particularly a liquid chromatograph that uses filler with a particle size of 2 μm or less is called Ultra High Performance Liquid Chromatograph (UHPLC).

Liquid chromatograph measurement data is indicated by a peak that shows the relation between the separation time (retention time) of the sample and the detection signal intensity of the detector. Retention time is peak top time and if the analysis condition is the same, it shows virtually the same value for each component of the sample. For this reason, retention time is used as information to identify a separated component.

On the other hand, detection signal intensity is correlated with the concentration of the sample and used as information to calculate the concentration of a separated component. In the liquid chromatograph, it is possible to identify the separated component and determine its concentration from the peak retention time of the separated component and the signal intensity.

As mentioned above, in the liquid chromatograph, the particle size of column filler is miniaturized in order to improve the performance and as a result, the devices and channels that constitute the liquid chromatograph, especially the devices and channels on the upstream side of the column, are required to provide high pressure resistance. As the devices increasingly deal with high pressures, the influence of a pressure leak from a liquid feeding apparatus or analysis channel under a high pressure environment on the analysis performance is becoming larger.

If a pressure leak occurs in the joint or the like of the liquid feeding apparatus or the analysis channel, the separation time as the object of measurement might vary. For the liquid chromatograph that identifies the components of the sample on the basis of separation time, this means a decline in the reliability of measurement data. In addition, depending on the solvent in use, outflowing from the channel might result in an environmental impact or device breakdown.

In the liquid chromatograph that is required to provide high separation performance, such as UHPLC, there is a tendency to decrease the inside diameter of the pipe in order to reduce diffusion of the sample in the analysis channel. In this type of system, it is necessary to check not only for a pressure leak from the pipe joint but also for a clog in the pipe.

For the above reason, when high pressure liquid chromatographs such as HPLC and UHPLC are operated, it is desirable to check the channel condition by seeing whether or not a solvent leak occurs due to a pressure leak during preliminary operation of the analyzer and/or whether or not the analysis channel is clogged and at the same time conduct a pressure test periodically (for example, at the time of replacement of a pressure-resistant component) to confirm that the pressure resistance of the device is maintained (hereinafter, this check process is called "channel check process").

When the channels in the device or whole system are checked, it is necessary to connect an airtight stopper to the channel of the device to be checked and increase the pressure in the device or channel as the object of test to a given value while feeding a liquid by a liquid feeding apparatus. However, the worker must adjust and operate the device so as to maintain a high pressure state while preventing the device from breaking down due to an excessive pressure rise.

The work to connect an airtight stopper to the channel, which is required to conduct a pressure test, might cause the stopper connection to deteriorate or break down. The work to connect an airtight stopper to conduct a pressure test might in itself cause deterioration in pressure resistance.

As mentioned above, a pressure test is effective as a test to check the performance of the liquid chromatograph. However, a pressure test must be performed safely and accurately and specialist skills and operation which require training are needed. Therefore, it is difficult for an ordinary user of the device to conduct a pressure test.

Patent Literature 1 discloses leak check with a flow rate sensor connected in a liquid feeding apparatus. In this method, it is possible to check the amount of leak in the liquid feeding apparatus, but it is impossible to perform leak check on the downstream side of the flow rate sensor and thus impossible to check for a pressure leak in the whole system. In addition, as liquid chromatograph systems are increasingly required to provide high pressure resistance, the flow rate sensor itself is also required to provide high pressure resistance.

Patent Literature 2 discloses a method in which a channel closing mechanism is provided on the most downstream side of a liquid chromatograph device to conduct a pressure test. In this method, since the pressure test range covers a detector which is installed downstream of the column and in which a pressure in the channel is not high pressure, the detector has to provide high pressure resistance, which means that a performance that is basically unnecessary must be added. Patent Literature 2 also proposes provision of a channel closing mechanism between units that constitute the liquid chromatograph. However, the connection of a channel closing mechanism which is not used in the liquid chromatograph might cause the sample to be measured to diffuse or stagnate in the pipe joint, thereby causing a decline in separation performance or carryover.

CITATION LIST

Patent Literature

Patent Literature 1: U.S. Pat. No. 7,685,866
Patent Literature 2: Japanese Unexamined Patent Application Publication No. 2005-257609

SUMMARY OF INVENTION

Technical Problem

The present invention has been made in view of the above points and has an object to provide a liquid chromatograph analyzer that makes it possible to easily perform tests of channels in a system as a whole without adding a complicated mechanism and a method of controlling the same.

Solution to Problem

A liquid chromatograph analyzer according to one aspect of the present invention includes: a liquid feeding part that feeds a mobile phase; a sample introduction part that introduces a sample into the mobile phase; a separation column connected to a downstream side of the sample introduction part and separating the sample into a plurality of components; a detector connected to a downstream side of the separation column and detecting the separated components; and a control part controlling the liquid feeding part, the sample introduction part, and the detector.

The liquid feeding part includes: a liquid feeding channel to feed the mobile phase; a drainage channel to release pressure in the liquid feeding channel; an analysis channel discharging the mobile phase into the sample introduction part; and a channel switching valve selectively connecting the liquid feeding channel to one of the drainage channel and the analysis channel. The channel switching valve is configured to be able to provide a tight stopper state in which the liquid feeding channel is connected to neither the analysis channel nor the drainage channel.

A method of controlling a liquid chromatograph analyzer according to the present invention includes the steps of: setting a switching valve, which selectively connects a channel, to a tight stopper state in which the channel is not connected to any other channel; increasing the pressure of feeding of a mobile phase; stopping the feeding after the pressure in the channel increases to a set value; and determining the pressure resistance of a portion upstream of the switching valve based on a variation in the pressure.

Advantageous Effects of Invention

According to the present invention, it is possible to provide a liquid chromatograph analyzer that makes it possible to easily perform tests of channels in a system as a whole without adding a complicated mechanism and a method of controlling the liquid chromatograph analyzer.

DESCRIPTION OF EMBODIMENTS

Figure 1:
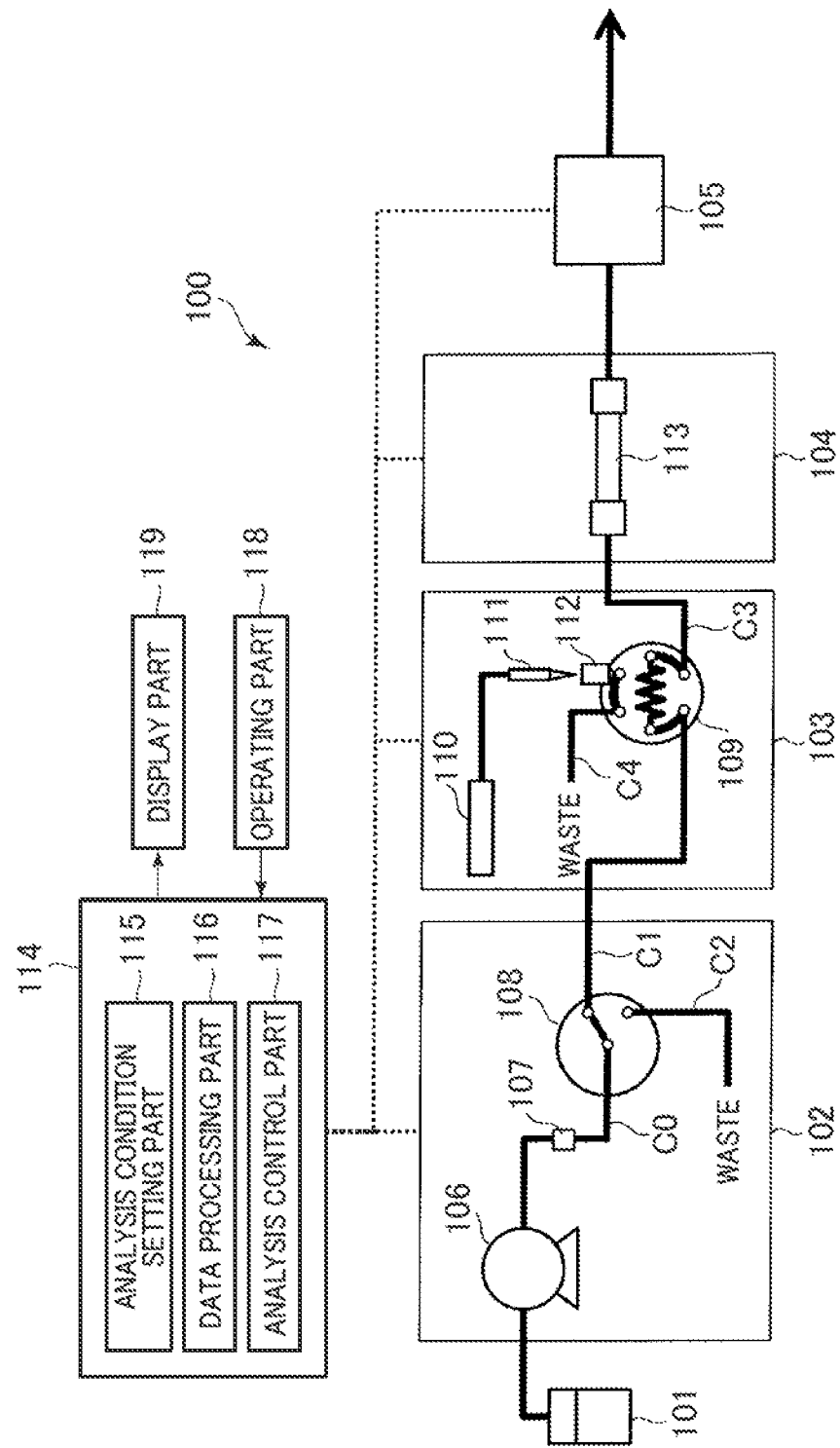
FIG. 1 is a schematic view explaining an exemplary configuration of a liquid chromatograph analyzer according to a first embodiment.

Hereinafter, embodiments of the present invention will be described referring to the accompanying drawings. In the accompanying drawings, the functionally same elements may be designated by the same reference numerals or corresponding numerals. Although the accompanying drawings show embodiments and examples of implementation which are in accordance with the principle of the present disclosure, these are intended for understanding of the present disclosure and should never be used to interpret the present disclosure in a limited way. The description in this specification merely suggests a typical example and does not limit the claims or examples of application of the present disclosure in any sense.

In the embodiments, an explanation thereof is made in a sufficiently detailed way to enable a person skilled in the art to embody the present disclosure, but another implementation or embodiment is also possible. It should be understood that changes in composition/structure or replacement of various elements can be made without departing from the scope and spirit of the technical idea of the present disclosure. Therefore, the description given below should not be interpreted as being limitative. For example, the shape of the automatic switching valve and the number of channels are not limited to those in the embodiments described below.

First Embodiment

Referring to the schematic diagram of FIG. 1, an explanation will be given of an exemplary configuration of a liquid chromatograph analyzer 100 according to the first embodiment. The liquid chromatograph analyzer 100 is mainly comprised of a mobile phase tank 101, a liquid feeding unit 102 (liquid feeding part), a sample introduction unit 103 (sample introduction part), a column temperature adjustment unit 104, a detector 105, an integrated control part 114, an operating part 118, and a display part 119.

The liquid feeding unit 102 includes, as an example, a liquid feeding apparatus 106, a pressure detector 107, a channel switching valve 108, a liquid feeding channel C0, an analysis channel C1, and a drainage channel C2. The liquid feeding apparatus 106 has the function to suck the mobile phase for use in transportation and separation of a sample, from the mobile phase tank 101 and compress it at high pressure and discharge it. As an example, the liquid feeding unit 102 can be configured as a liquid chromatograph system that can feed one or a plurality of mobile phases from one liquid feeding apparatus 106.

The pressure detector 107 is a sensor device that detects the pressure in the liquid feeding channel C0 for feeding the mobile phase in the liquid feeding unit 102, and in the pipe up to the detector. The channel switching valve 108 is connected downstream of the liquid feeding apparatus 106 and has the function to selectively connect the liquid feeding channel C0 to either the analysis channel C1 connected to the sample introduction unit 103 or the drainage channel C2. In addition, the channel switching valve 108 is configured to be able to provide a tight stopper state in which no connection is performed to any of the analysis channel C1 and the drainage channel C2, when a pressure test is performed, which will be described later.

The sample introduction unit 103 is mainly comprised of a sample introduction valve 109, a sample metering pump 110, and a needle 111. The sample introduction valve 109 is connected to the analysis channel C1 and has the switching function to introduce the sample discharged by the sample metering pump into the analysis channel C3 while introducing the mobile phase into the analysis channel C3 downstream. The sample introduction valve 109 has a sample inlet 112 for introducing sample. The sample metering pump 110 has the function to discharge the sample as the object of measurement into the sample inlet 112 through the needle 111. The sample introduced from the sample metering pump 110 into the sample introduction valve 109 is mixed with the mobile phase and discharged to the analysis channel C3.

The column temperature adjustment unit 104 can house a separation column 113 and has the function to control the temperature of the separation column 113 to make it constant. The separation column 113 is connected to the sample introduction unit 103 through the analysis channel C3 and separates the sample introduced from the sample introduction unit 103 by the mobile phase, into components. The detector 105 is connected downstream of the column temperature adjustment unit 104 and has the function to detect the components separated in the separation column 113.

The integrated control part 114 is a control part to control the liquid feeding unit 102, sample introduction unit 103, column temperature adjustment unit 104, and detector 105 to acquire liquid chromatograph data and control operation for a pressure test. The integrated control part 114 includes, as an example, an analysis condition setting part 115 for setting the analysis condition to control the abovementioned units 102 to 104, a data processing part 116 for analyzing the analysis result output from the detector 105, and an analysis control part 117 for outputting the timing to start each analysis, etc. to the units 102 to 104. The operating part 118 is a device that includes, for example, input devices such as a keyboard, ten key, and mouse and enables the user to enter various instructions relating to control by the integrated control part 114. The display part 119 is a device to display the analysis condition and the analysis result and can be constituted, for example, by a liquid crystal display, organic EL display or the like.

Figure 2A:
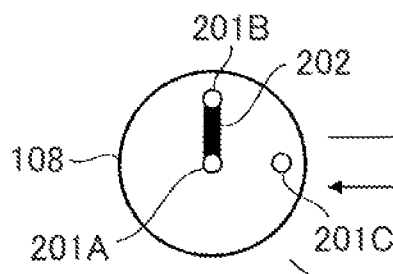
FIGS. 2A-2C are schematic views exemplarily illustrating a detailed configuration and operation of a channel switching valve 108.
Figure 2B:
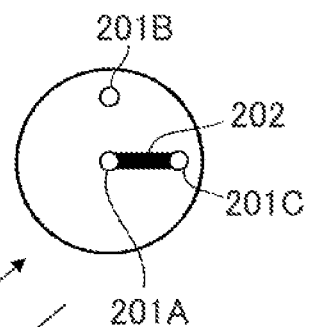
Figure 2C:
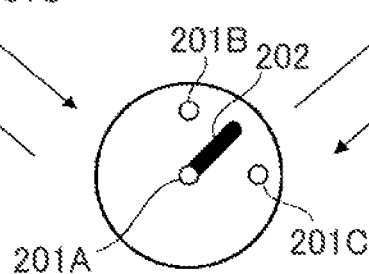

FIG. 2 shows an example of the configuration and operation of the channel switching valve 108. The channel switching valve 108 includes three pipe joints 201A to C and a movable channel 202 to connect two of the three pipe joints 201A to C. The pipe joint 201A can be, for example, connected to the liquid feeding channel C0, the pipe joint 201B can be connected to the analysis channel C1, and the pipe joint 201C can be, for example, connected to the drainage channel C2. Here, the movable channel 202 is configured to be able to rotate around the pipe joint 201A with one end connected to the pipe joint 201A in the center. The other end of the movable channel 202 can be, by rotation, connected to one of the two other pipe joints, 201B and 201C (state (A) or (B) in FIG. 2) or unconnected to any pipe joint (state (C) in FIG. 2) (tight stopper state).

While conventional liquid chromatograph analyzers perform switching operation only between the state (A) and state (B), the chromatograph analyzer in the first embodiment can provide not only the state (A) and state (B), but also the state (C), namely a tight stopper state in which no connection is performed to any of the analysis channel C1 and the drainage channel C2. Given this state (C), it is possible to provide the tight stopper function to perform an automatic pressure test. By providing the tight stopper state in a conventional channel switching valve, a pressure test can be performed without adding a special component.

Figure 3A:
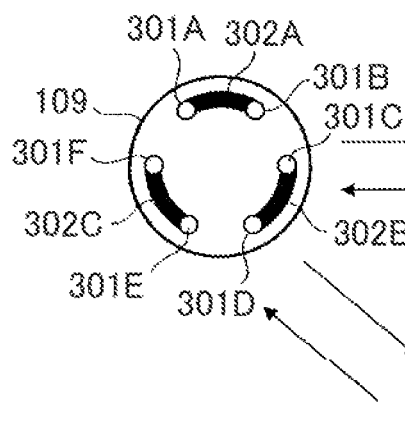
FIGS. 3A-3C are schematic views exemplarily illustrating a configuration and operation of a sample introduction valve 109.
Figure 3B:
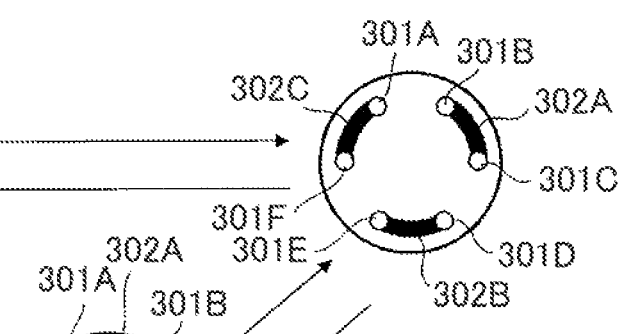
Figure 3C:
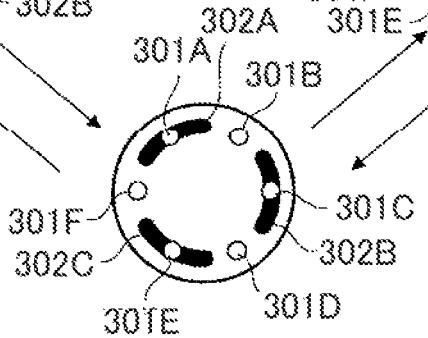

FIG. 3 shows an example of the configuration and operation of the sample introduction valve 109. The sample introduction valve 109 is comprised of six pipe joints 301A to F and three movable channels 302A to C to connect two pipe joints among them. The pipe joints 301A to F are arranged along one circumference. The movable channels 302A to C have a curvature approximately equal to the curvature of the circumference along which the pipe joints 301A to F are arranged and are movable along the circumference.

The movable channels 302A to C are configured so that when one end thereof is connected to the pipe joint 301A to F, the other end is connected to the adjacent pipe joint 301A to 301F (states (A) and (B) in FIG. 3). For example, in the state (B), the sample is introduced from the sample metering pump 110 and in the state (A), the introduced sample is fed to the downstream side by the mobile phase. On the other hand, when one end of the movable channel 302A to C is not connected to any of the pipe joints 301A to F, the other end is also not connected to any of the pipe joints 301A to F (state (C)). In this case, the sample introduction valve 109 is not connected to any of the analysis channel C1, analysis channel C3, and drainage channel C4 and the sample introduction valve 109 goes into a tight stopper state. In the tight stopper state, a pressure test can be performed.

In a conventional sample introduction valve, switching is done only between the state (A) and state (B). On the other hand, the sample introduction valve 109 in the first embodiment in FIG. 1 can provide not only the state (A) and state (B), but also the state (C), namely a tight stopper state in which the analysis channel C1 is connected to neither the analysis channel C nor the drainage channel C4. Given the state (C), it is possible to provide a tight stopper state to perform a pressure test and a pressure test can be performed upstream of the sample introduction valve 109. By providing the tight stopper state in a conventional sample introduction valve, a pressure test can be performed without adding a special component.

Figure 4:
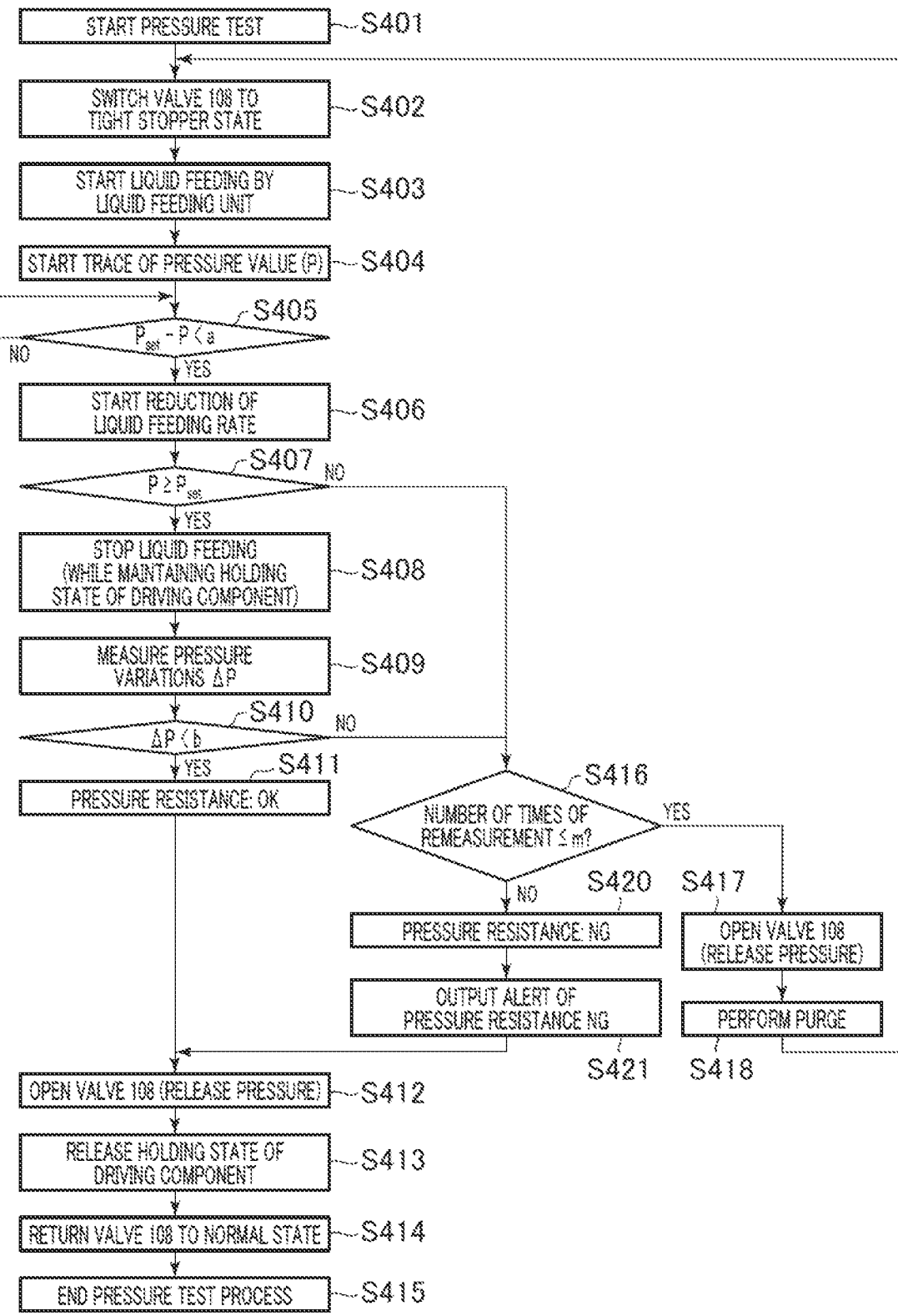
FIG. 4 is a flowchart explaining an exemplary procedure when a pressure test is performed for the liquid chromatograph analyzer of the first embodiment.

Next, referring to the flowchart of FIG. 4, an explanation will be made of an exemplary procedure to perform a pressure test in the liquid chromatograph analyzer in the first embodiment. In FIG. 4, an explanation is made, as an example, of the case that the channel switching valve 108 is in the tight stopper state but the procedure is the same as even in the case that the sample introduction valve 109 is in the tight stopper state.

As an instruction to start a pressure test is given (Step S401), the channel switching valve 108 of the liquid feeding unit 102 is switched to the tight stopper state (state (C) in FIG. 2) (Step S402). The liquid feeding apparatus 106 starts feeding the liquid until a preset flow rate is reached (Step S403). Then, the pressure detector 107 in the liquid feeding unit 102 starts acquiring (tracing) the pressure value (P) (Step S404). At this time, it is desirable that in order to gradually increase the pressure in the tightly stopped device, the liquid feeding apparatus 106 should change the flow rate at a fixed acceleration rate or at regular time intervals in a stepwise fashion up to the set liquid feeding rate.

When the pressure value (P) approaches a pressure test pressure (Pset) as a set value and for example, reaches a pressure point smaller than Pset by a certain value a (Step S405), the liquid feeding apparatus 106 reduces the liquid feeding rate continuously or in a stepwise fashion in order to prevent an excessive pressure rise beyond the set pressure test pressure (Pset) (Step S406).

If the pressure value (P) reaches the pressure test pressure (Pset) or more (Yes at Step S407), the liquid feeding apparatus 106 stops feeding the liquid (Step S408). At this time, in order to prevent the pressure of the compressed mobile phase from activating the driving component of the liquid feeding apparatus 106, the state in which the driving component is held (holding state) is maintained. As a concrete holding method, the motor activating the driving component is stopped in an excited state so that the driving component can be held.

After that, the integrated control part 114 measures pressure variation (ΔP) in the pressure value (P) detected by the pressure detector 107 just after the pressure test pressure (Pset) is reached (Step S409). At this time, if the variation (ΔP) in pressure value (P) per given time is less than a threshold (b) (Yes at Step S410), the integrated control part 114 determines that the liquid chromatograph analyzer meets the required pressure resistance (OK) (Step S411).

If it is determined that the required pressure resistance is met (OK), after the channel switching valve 108 is switched to the state (state B) in which the liquid feeding channel C0 is connected to the drainage channel C2 in order to release the pressure in the device (Step S412), the driving component holding state of the liquid feeding apparatus 106 is released (Step S413). Then, the channel switching valve 108 is returned to the state for normal analysis (A) (Step S414) and the pressure test is ended (Step S415).

On the other hand, if the pressure value (P) does not reach the pressure test pressure (Pset) in the period to increase the pressure up to the pressure test pressure (Pset) (No at Step S407) or the pressure variation (ΔP) after reaching the pressure test pressure (Pset) is equal to or more than the threshold (b) (No at Step S410), the process goes to Step S416. After Step S416, the purge step (bubble removal step) or the pressure resistance NG decision and subsequent step are carried out depending on the number of times of remeasurement.

At Step S416, a decision is made as to whether the number of times of remeasurement of pressure value (P) in the pressure test is not more than a prescribed number of times of repeating (m). If the number of times of remeasurement is not more than the prescribed number of times of repeating m (Yes at Step S416), a probable cause other than pressure leakage may be that bubbles may have entered the cylinder of the liquid feeding apparatus 106 that compresses and discharges the mobile phase. Therefore, the integrated control part 114 causes the liquid feeding apparatus 106 to start the purge step. In other words, if the pressure variation (ΔP) is equal to or more than the threshold (b), the integrated control part 114 causes the liquid feeding apparatus 106 to repeat the purge step for the prescribed number of times of repeating (m).

Before carrying out the purge step, the liquid feeding channel C0 of the channel switching valve 108 is connected to the drainage channel C2 (state B) to release the pressure in the liquid feeding channel C0 (Step S417) and then the purge step is started in the liquid feeding apparatus 106 (Step S418). After the purge step is ended, the process returns to Step S402 and subsequently the same steps as above are carried out again.

On the other hand, if the number of times of remeasurement is more than the prescribed value (m) (No at S416), it is determined that the reason that the pressure value (P) does not rise is not bubbles in the cylinder but in the device itself. Therefore, the integrated control part 114 determines that the device as the object does not meet the pressure resistance (NG) (Step S420) and causes the display part 119 to output an alert (warning) (Step S421). After output of the alert, the integrated control part 114 switches the channel switching valve 108 to obtain the state (B) in which the liquid feeding channel C0 and the drainage channel C2 are connected, to release the pressure in the device (Step S412), releases the driving component holding state (Step S413), returns the channel switching valve 108 to the state (A) as a normal analysis position (Step S414), and ends the pressure test (S415).

Figure 5:
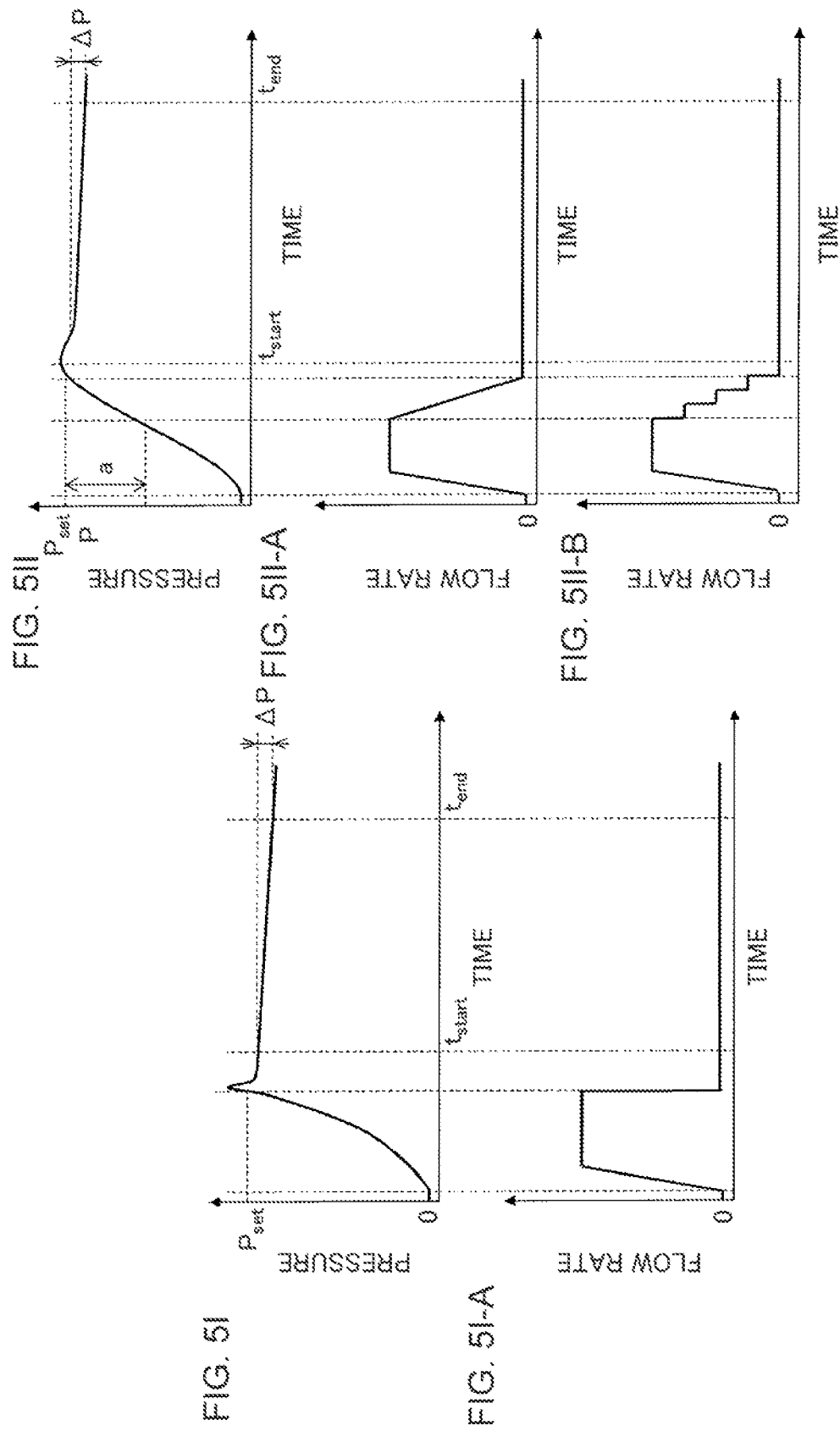
FIGS. 5I-5IIB are graphs illustrating exemplary pressure variations during execution of a pressure test in the first embodiment.

FIG. 5 illustrates exemplary pressure variations during execution of a pressure test in the first embodiment. FIG. 5 (i) illustrates exemplary pressure variations in the case that in the pressure rise process, the pressure is increased continuously at a given flow rate after reaching the prescribed flow rate until the prescribed pressure (Pset) is reached (FIG. 5 (i-a)). As shown in FIG. 5 (i), when the pressure is increased continuously at a given flow rate until the prescribed pressure (Pset) is reached, in some cases the pressure suddenly rises due to the time difference after reaching the prescribed pressure until the liquid feeding apparatus 106 is stopped. In such a case, an excessive load might be applied to the liquid feeding apparatus 106 or channel.

On the other hand, FIG. 5 (ii) illustrates exemplary pressure variations in the case that when the pressure value (P) approaches the prescribed pressure (Pset) in the pressure rise process, the flow rate (velocity) of the mobile phase is reduced in a stepwise fashion. For example, if the pressure value (P) reaches a value smaller than the prescribed pressure (Pset) by a, reduction of the flow rate can be started. By doing so, a spike-like rise in the pressure at the time of reaching the prescribed pressure (Pset) can be suppressed. The method of reducing the flow rate may be to change the flow rate at a given acceleration rate as shown in FIG. 5 (ii-a) or to change the flow rate at regular time intervals in a stepwise fashion as shown in FIG. 5 (ii-b). Alternatively, a combination of the methods of changing the flow rate as shown in FIG. 5 (ii-a) and FIG. 5 (ii-b) can be applied.

As explained above, according to the first embodiment, the channel switching valve 108 and the sample introduction valve 109 are configured to provide a tight stopper state in addition to the normal state, so a pressure test of the system as a whole can be performed easily without adding a complicated mechanism.

Second Embodiment

Figure 6:
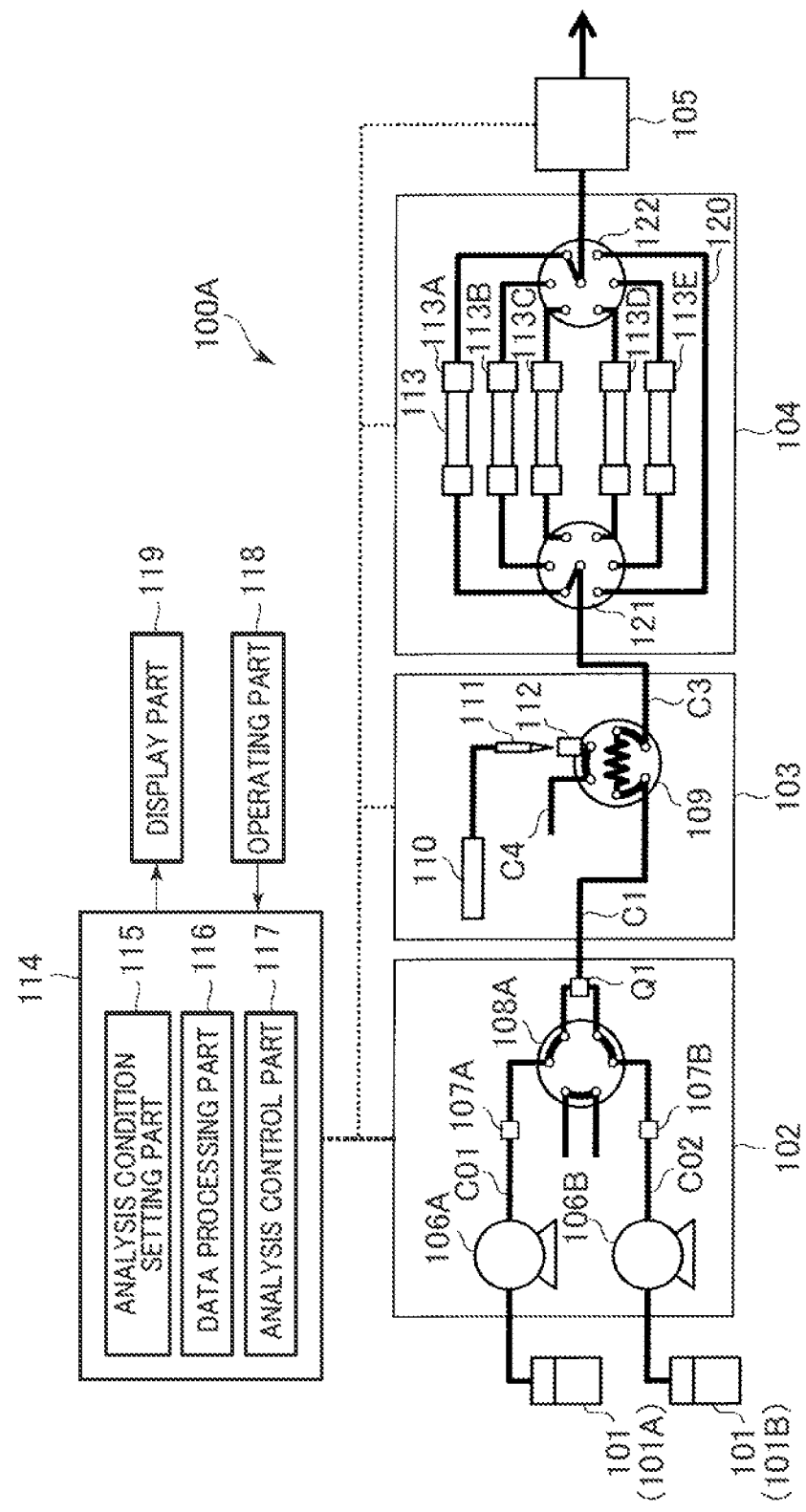
FIG. 6 is a schematic view explaining an exemplary configuration of a liquid chromatograph analyzer according to a second embodiment.

Next, a liquid chromatograph analyzer 100A according to the second embodiment will be described referring to FIG. 6. In FIG. 6, the same elements as in the first embodiment are designated by the same reference signs and repeated description thereof is omitted.

The liquid chromatograph analyzer 100A is mainly comprised of a mobile phase tank 101, a liquid feeding unit 102, a sample introduction unit 103, a column temperature adjustment unit 104, a detector 105, an integrated control unit 114, an operating part 118, and a display part 119. However, the liquid feeding unit 102 includes two liquid feeding apparatuses 106A and 106B and the two liquid feeding apparatuses 106A and 106B are connected to different mobile phase tanks 101A and 101B.

Pressure detectors 107A and 107B are connected to the liquid feeding channels C01 and C02 connected to the discharge ports of the liquid feeding apparatuses 106A and 106B, respectively. In addition, a channel switching valve 108A to selectively switch to the analysis channel or the drainage channel is provided downstream of the two liquid feeding apparatuses 106A and 106B. The mobile phase discharged from the channel switching valve 108A is introduced into the sample introduction unit 103 through a junction Q1. The configuration of the sample introduction unit 103 is the same as in the first embodiment. In the example in FIG. 6, the junction Q1 is installed downstream of the channel switching valve 108A, but instead the junction Q1 can be installed upstream of the channel switching valve 108A. In that case, a pressure detector shared by the liquid feeding apparatuses 106A and 106B can be installed downstream of the junction Q1 and upstream of the channel switching valve 108A.

On the other hand, the column temperature adjustment unit 104 is configured to be able to house a plurality of separation columns 113A to E. The plural separation columns 113A to E contain fillers of different natures. In addition, the column temperature adjustment unit 104 has a bypass channel 120 that enables the mobile phase to be introduced into the detector 105 without passing through the separation columns 113A to E. This bypass channel 120 is arranged in parallel to the plural separation columns 113A to 113E in the column temperature adjustment unit 104.

In the column temperature adjustment unit 104, column switching valves 121 and 122 to selectively connect any of the separation columns 113A to E or the bypass channel 120 to the analysis channel are provided upstream and downstream of the separation columns 113A to E. As shown in FIG. 6, the column switching valves 121 and 122 include a plurality of first pipe joints to be connected to the separation columns 113A to E and bypass channel 120, a second pipe joint to be connected to the analysis channel, and a movable channel to selectively connect the first and second pipe joints. One end of the movable channel rotates around the second pipe joint so as to be connected to one of the plural first pipe joints and thereby one of the plural separation columns or the bypass channel 120 can be connected to the analysis channel.

Furthermore, the column switching valves 121 and 122 can provide not only a state in which they are connected to the plural separation columns 113A to E or the bypass channel 120, but also a state in which they are not connected to any of the separation columns 113A to E and the bypass channel 120 (tight stopper state). Since the column switching valves 121 and 122 have a structure to be able to provide a tight stopper state, a pressure test can be performed in a channel upstream of them.

In the device according to the second embodiment as shown in FIG. 6, the channel switching valve 108, sample introduction valve 109 and column switching valve 121 are arranged upstream of the separation columns 113A to 113E that are put in a high pressure environment during analysis. In addition, the column switching valve 122 is located downstream of the separation columns 113A to 113E. By switching these valves 108, 109, 121, and 122 to the abovementioned tight stopper state and conducting pressure tests as appropriate, not only pressure testing can be performed collectively for the channels from the liquid feeding unit 102 to the column temperature adjustment unit 104, but also a pressure test can be performed separately for each of the units 102, 103, and 104 and the spot where the problem with pressure resistance exists can be detected.

Figure 7:
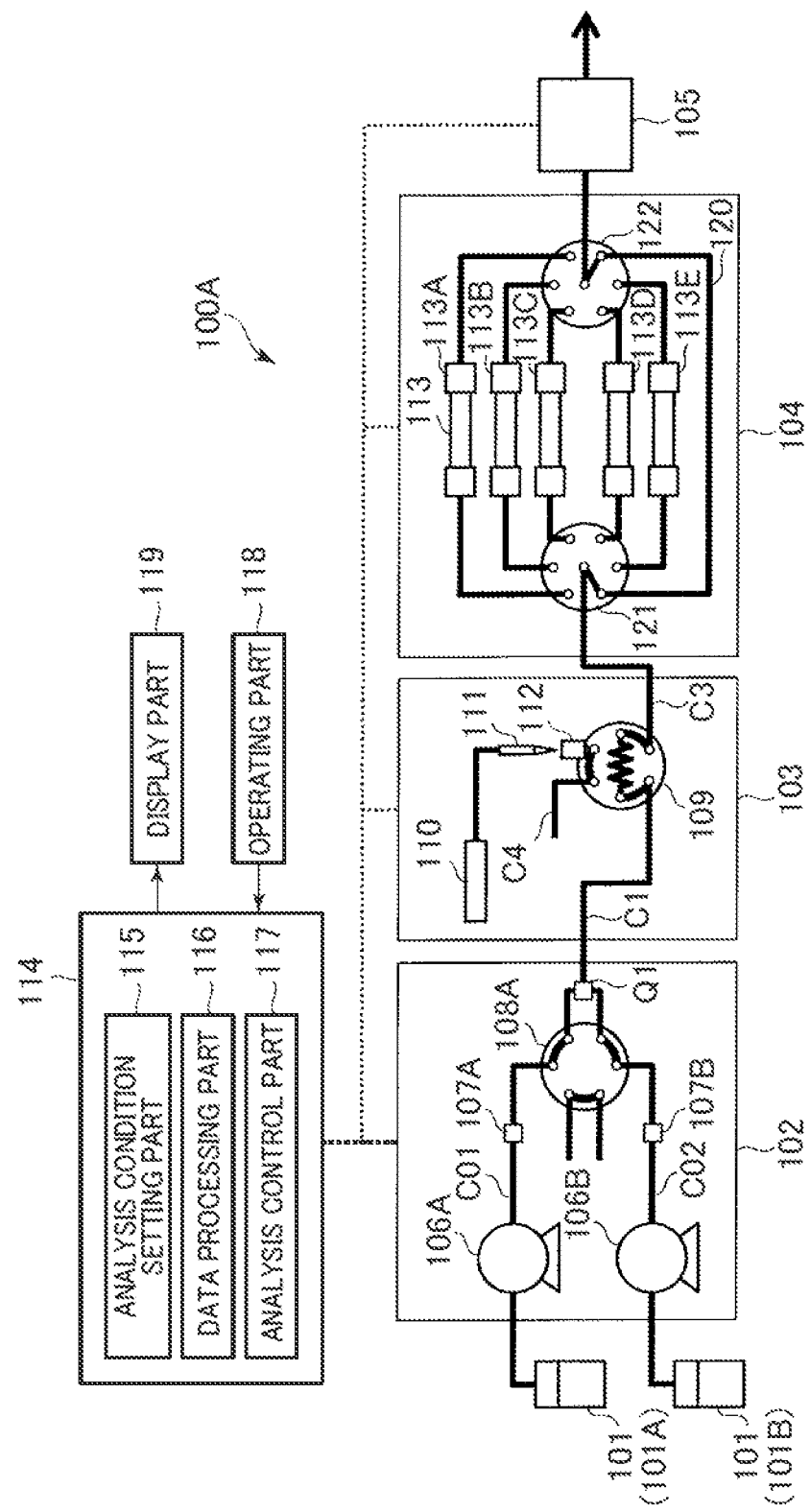
FIG. 7 is a schematic view explaining operation of the liquid chromatograph analyzer of the second embodiment.

As shown in FIG. 7, the liquid feeding apparatus 106A or 106B can feed the mobile phase at a desired flow rate with the column switching valves 121 and 122 connected to the bypass channel 120. In this case, the liquid feeding pressure in the liquid chromatograph analyzer 100 except the separation columns 113A to E can be checked. At this time, the liquid feeding pressure can be calculated from such information as the physical property values of the mobile phase to be fed, the flow rate, and the inside diameter and length of the connected pipe, so it is possible to check whether there is a clog in the analysis channel or not.

Third Embodiment

Figure 8:
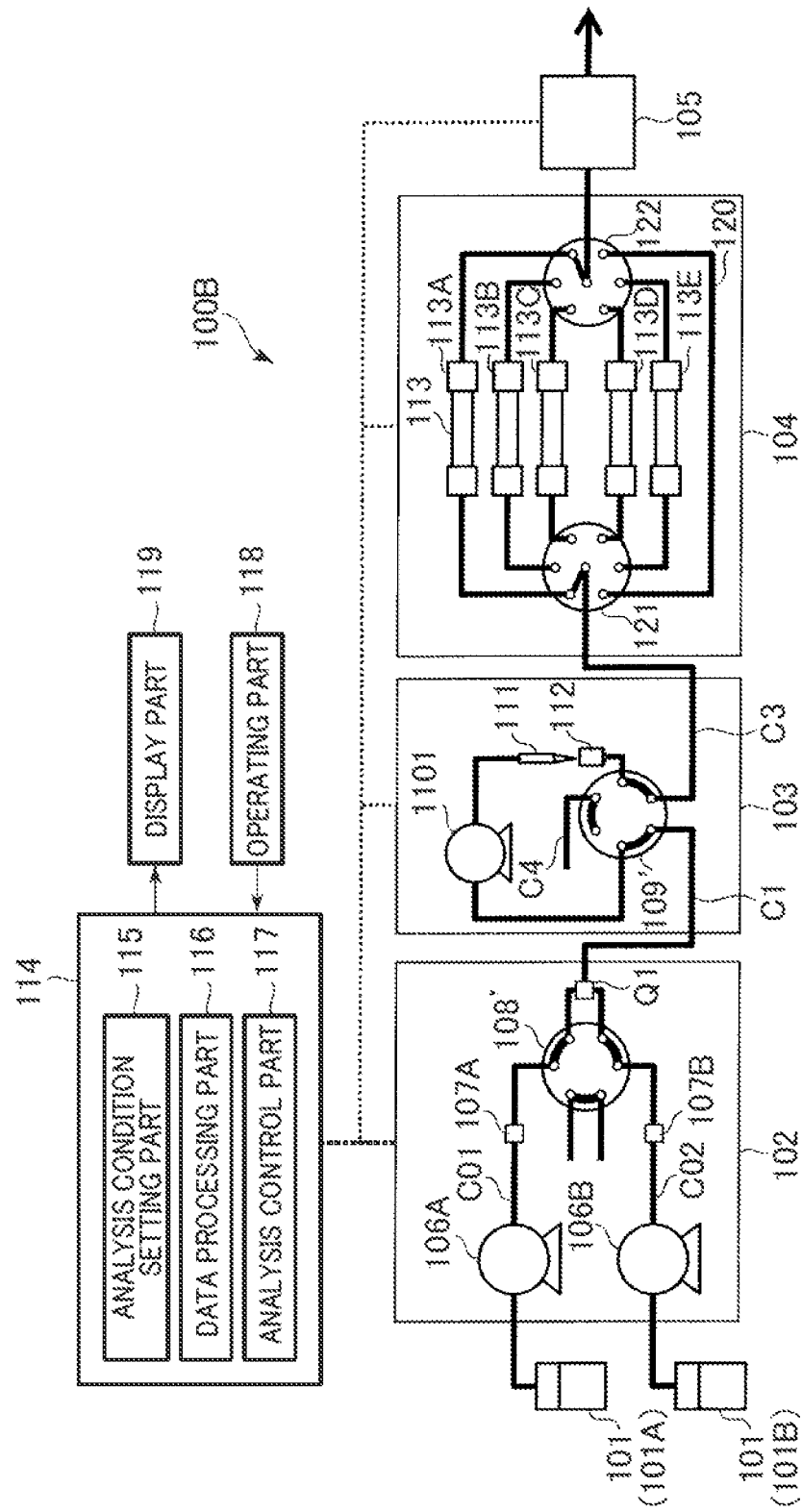
FIG. 8 is a schematic view explaining an exemplary configuration of a liquid chromatograph analyzer according to a third embodiment.

Next, a liquid chromatograph analyzer 100B according to the third embodiment will be described referring to FIG. 8. In FIG. 8, the same elements as in the second embodiment are designated by the same reference signs as those in FIG. 6 and repeated description thereof is omitted.

In the third embodiment (FIG. 8), the configuration of the sample introduction unit 103 is different from that in the second embodiment. The sample introduction unit 103 in FIG. 8 is mainly comprised of a sample introduction valve 109', a sample metering pump 1101, and a needle 111.

The mobile phase introduced from the analysis channel C1 extending from the liquid feeding unit 102 is once introduced into the sample introduction valve 109', and then again introduced into the sample introduction valve 109' through the sample metering pump 1101, needle 111, and sample inlet 112 and then introduced into the analysis channel C3. In this configuration, the sample metering pump 1101 and needle 111 are also required to have high pressure resistance. However, by conducting a pressure test with the column switching valve 121 of the column temperature adjustment unit 104 in a tight stopper state, it is possible to check whether or not there is a leak in the components upstream of the column switching valve 121, including the sample metering pump 1101 and needle 111.

Figure 9:
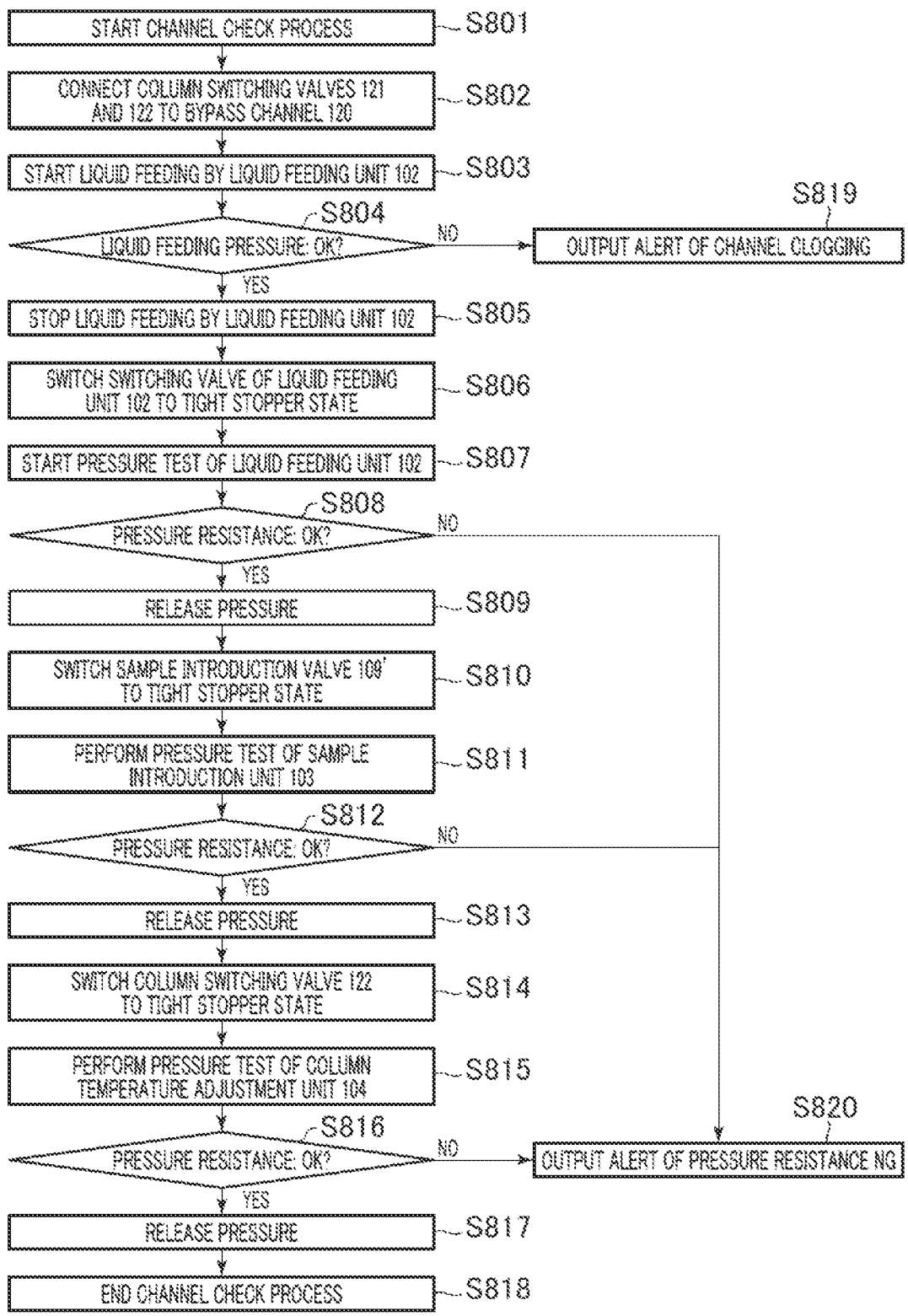
FIG. 9 is a flowchart explaining an exemplary procedure when a channel check process is performed for the liquid chromatograph analyzer of the third embodiment.

Referring to FIG. 9, an explanation will be made of operation (check for a leak in the channels, check for a clog in the channels, and the channel check process including a pressure resistance test) of the liquid chromatograph analyzer according to the third embodiment.

In the channel check process, the order in which check for a leak and/or clog in the channels and pressure resistance tests are carried out can be arbitrarily selected. The order in which these are carried out can be changed by changing the order in which the valves 108', 109', 121, and 122 are switched to the tight stopper state. However, since the liquid feeding unit 102 must feed a liquid into the channels of the device, it is desirable to conduct pressure tests by increasing the pressure in the channels, after checking whether or not there is a clog in the channels, in the order from the upstream side.

As the channel check process is started (Step S801), the column switching valves 121 and 122 are connected to the bypass channel 120 (Step S802) and then the liquid feeding unit 102 starts feeding the liquid (Step S803). The pressure detectors 107A and 107B in the liquid feeding unit 102 start acquiring data on the pressure value (P) of the liquid feeding channels C01 and C02 and the integrated control part 114 compares the pressure value (P) with a preset specified pressure range (Step S804). If the pressure value (P) exceeds the specified pressure range, it is determined that there is a clog in the channels and an alert is given (Step S819).

On the other hand, if the pressure value (P) is within the specified pressure range, operation of the liquid feeding apparatus 106A or 106B is once stopped in order to prevent a sudden pressure rise at the time of closing the valve (Step S805) and then the process goes to pressure tests of the units 102 to 104.

In a pressure test, the channel switching valve 108' installed in the liquid feeding unit 102 is switched to the tight stopper state (Step S806) and a pressure test of the liquid feeding unit 102 is started (Step S807). When the pressure value (P) detected by the pressure detectors 107A and 107B reaches the pressure test pressure (Pset), calculation of leak pressure in the liquid feeding unit 102 is started and the pressure resistance is determined from pressure variations (P) at regular time intervals (Step S808). At this time, for control of the pressure value (P), the same method as in the above embodiments can be adopted.

If it is determined that the liquid feeding unit 102 does not meet the prescribed pressure resistance, the display part 119 or the like outputs an alert indicating pressure resistance NG for the inside of the liquid feeding unit 102 (Step S820). On the other hand, if it is determined that the liquid feeding unit 102 meets the pressure resistance (OK), the channel switching valve 108' is switched to the state (B) to release the pressure in the channels C01 and C02 (Step S809) and then the process goes to a pressure test of the sample introduction unit 103.

The pressure test of the sample introduction unit 103 can also be performed almost in the same way as the process for the liquid feeding unit 102. First, the column switching valve 121 connected downstream of the sample introduction unit 103 is switched to the tight stopper state (Step S810). After that, the liquid feeding unit 102 starts feeding the mobile phase. As the liquid feeding unit 102 continues feeding the liquid in the tightly stopped channels from the liquid feeding apparatus 106 to the column switching valve 121, the pressure in the channels down to the sample introduction unit 103 rises. As soon as the pressure value (P) detected by the pressure detectors 107A and 107B reaches the pressure test pressure (Pset), calculation of the pressure (P) from the liquid feeding unit 102 to the sample introduction unit 103 is started and the variation (ΔP) in the pressure value (P) per given time are calculated and based on this, the pressure resistance of the sample introduction unit 103 is determined (Step S812).

If the sample introduction unit 103 does not meet the specification which prescribes the pressure resistance (NG), based on the fact that the pressure resistance of the liquid feeding unit 102, located immediately before it, meets the specification (OK), it is determined that there is a leak between the liquid feeding unit 102 and the sample introduction unit 103 and an alert is given (Step S820). On the other hand, if it is determined that the pressure resistance is met, the column switching valve 121 is switched for connection to the bypass channel 120 to release the pressure (Step S813). After that, the process goes to a pressure test of the column temperature adjustment unit 104.

The pressure test of the column temperature adjustment unit 104 is performed using the column switching valve 122. First, after the column switching valve 122 is switched to the tight stopper state (Step S814), the liquid feeding unit 102 starts feeding the mobile phase and thereby pressure tests of the column temperature adjustment unit 104 and the separation columns 113A to E are started (Step S815).

At this time, the column switching valve 121 is connected to the separation column as the object of pressure test. As the liquid feeding unit 102 continues feeding the liquid into the channels from the liquid feeding apparatuses 106A and 106B to the column switching valve 122, the pressure in the channels from the liquid feeding apparatuses 106A and 106B to the column switching valve 12 rises. As soon as the pressure value (P) detected by the pressure detectors 107A and 107B reaches the pressure test pressure (Pset), calculation of the pressure from the liquid feeding unit 102 to the column switching valve 122 is started and according to the variation (ΔP) in the pressure value (P) per given time, the pressure resistance of the column temperature adjustment unit 104 and the separation column as the object is determined (Step S816).

If the specification which prescribes the pressure resistance for the column temperature adjustment unit 104 and the like is not met (NG), based on the fact that the pressure resistances of the liquid feeding unit 102 and the sample introduction unit 103 meet the specification, it is determined that there is a leak between the column switching valve 121 and the column switching valve 122 and an alert is given (Step S820).

On the other hand, if it is determined that the specification which prescribes the pressure resistance for the column temperature adjustment unit 104 and the like is met (OK), the column switching valve 121 is switched to release the pressure (Step S817) and the channel check process is ended.

As explained above, by performing a series of steps for the channel check process shown in the flowchart of FIG. 9, it is possible to check whether or not there is a clog in the channels in the liquid chromatograph analyzer and whether or not there is a leak in the channels and conduct pressure tests and if the pressure resistance is not met, it is possible to detect the spot of pressure leak.

MISCELLANEOUS

The present invention is not limited to the above embodiments but includes many variations. For example, the above embodiments have been described in detail for easy understanding of the present invention; however the present invention is not limited to a structure which includes all the elements described above. An element of an embodiment may be replaced by an element of another embodiment or an element of an embodiment may be added to another embodiment. For an element of each embodiment, addition of another element, deletion, or replacement can be made.

LIST OF REFERENCE SIGNS 101, 101A, 101B Mobile phase tank
102 Liquid feeding unit
103 Sample introduction unit
104 Column temperature adjustment unit
105 Detector
106 Liquid feeding apparatus
107, 107A, 107B Pressure detector
108 Channel switching valve
Q1 Junction
109 Sample introduction valve
110, 1101 Sample metering pump 111 Needle
112 Sample inlet
113, 113A to 113E Separation column
114 Integrated control part
115 Analysis condition setting part
116 Data processing part
117 Analysis control part
118 Operating part
119 Display part
120 Bypass channel
121, 122 Column switching valve

What is claimed is:

1. A liquid chromatograph analyzer, comprising:
a liquid feeding part that feeds a mobile phase;
a sample introduction part that introduces a sample into the mobile phase;
a separation column connected to a downstream side of the sample introduction part and separating the sample into a plurality of components;
a detector connected to a downstream side of the separation column and detecting the separated components; and
a control part controlling the liquid feeding part, the sample introduction part, and the detector,
the liquid feeding part including:
a liquid feeding channel to feed the mobile phase;
a drainage channel to release pressure in the liquid feeding channel;
an analysis channel discharging the mobile phase into the sample introduction part; and
a channel switching valve, including a first movable channel and first pipe joints, selectively connecting the liquid feeding channel to one of the drainage channel and the analysis channel via the first pipe joints,
wherein the channel switching valve is configured to be able to provide a tight stopper state in which the liquid feeding channel is connected to neither the analysis channel nor the drainage channel at a position between the analysis channel and the drainage channel that does not have any pipe joints or ports,
wherein the sample introduction part further includes a sample introduction valve to introduce the sample into the mobile phase introduced from the analysis channel, a sample metering pump, a needle and a sample inlet, wherein the mobile phase is once introduced into sample introduction valve directly via the analysis channel and the mobile phase is again introduced into the sample introduction valve through the sample metering pump, the needle, and the sample inlet, the sample introduction valve including second movable channels and second pipe joints, each of the second movable channels having a curvature equal to a curvature of a circumference along which the second pipe joints are arranged, and the second movable channels are movable along the circumference, and
wherein the sample introduction valve is configured to be able to provide a tight stopper state in which the analysis channel is not connected to any other channel.

2. The liquid chromatograph analyzer according to claim 1, further comprising a column switching valve selectively connectable to a plurality of separation columns,
wherein the column switching valve is configured to be able to provide a tight stopper state in which any channel is not connected to any of the separation columns.

3. The liquid chromatograph analyzer according to claim 2, further comprising a bypass channel to introduce the mobile phase into the detector without passing through any of the separation columns,
wherein the column switching valve is configured to be selectively connectable to the bypass channel in addition to the separation columns.

4. The liquid chromatograph analyzer according to claim 1, wherein the liquid feeding part reduces flow rate in the liquid feeding channel when pressure in the liquid feeding channel approaches a set value during execution of a test.

5. The liquid chromatograph analyzer according to claim 4, wherein the liquid feeding part stops liquid feeding when the pressure in the liquid feeding channel becomes equal to or more than the set value, and the control part is configured to subsequently measure a variation in the pressure.

6. The liquid chromatograph analyzer according to claim 5, wherein the control part is configured to allow a bubble removal step to be repeated in the liquid feeding part by a predetermined number of times if the variation in the pressure is equal to or more than a threshold.

7. The liquid chromatograph analyzer according to claim 6, wherein if the number of times of repeating exceeds a specified value, the control part determines that a channel as an object of the test fails to meet a predetermined performance without allowing the bubble removal step to be further performed.

8. A method of controlling a liquid chromatograph analyzer, the method comprising:
setting a switching valve, the switching valve selectively connecting a channel, to a tight stopper state in which the channel is not connected to any other channel;
increasing pressure of feeding of a mobile phase;
stopping the feeding after pressure in the channel increases to a set value; and
determining pressure resistance of a portion upstream of the switching valve based on a variation in the pressure,
wherein when pressure in the channel approaches the set value during execution of a test, pressure in the channel is reduced,
wherein when the pressure in the channel becomes equal to or more than the set value, feeding of the mobile phase is stopped, and then a variation in the pressure is measured, and
wherein if the variation in the pressure is equal to or more than a threshold, a bubble removal step is repeated by a predetermined number of times.

9. The method according to claim 8, wherein if the number of times of repeating exceeds a specified value, the bubble removal step is not further performed, and a channel as an object of the test is determined to fail to meet a predetermined performance.

* * * * *